United States Patent [19]

Patel et al.

[11] 4,241,938
[45] Dec. 30, 1980

[54] WINDING PREVENTION BELT RETRACTOR FOR PASSIVE SHOULDER BELT SYSTEM

[75] Inventors: Chimanbhai M. Patel, Troy; Joseph J. Magyar, Rochester, both of Mich.

[73] Assignee: General Motors Corporation, Detroit, Mich.

[21] Appl. No.: 15,948

[22] Filed: Feb. 28, 1979

[51] Int. Cl.³ .................. A62B 35/02; B65H 75/48
[52] U.S. Cl. .................................. 280/803; 242/107.7
[58] Field of Search ............ 242/107.6, 107.7, 107.12; 280/807, 808, 803, 802, 806, 801; 297/475–478

[56] References Cited

U.S. PATENT DOCUMENTS

| | | | |
|---|---|---|---|
| 3,984,063 | 10/1976 | Knierieman | 242/107 |
| 4,023,746 | 5/1977 | Magyar | 242/107.7 |
| 4,108,395 | 8/1978 | Heath | 242/107.7 |
| 4,153,274 | 5/1979 | Rogers et al. | 242/107.7 X |
| 4,172,568 | 10/1979 | Yamanashi et al. | 242/107.6 |

Primary Examiner—John M. Jillions
Attorney, Agent, or Firm—Charles E. Leahy

[57] ABSTRACT

The invention provides an inertia locking seat belt retractor for winding a shoulder belt having one end mounted on the vehicle door so that door movement moves the belt between stowed and restraining positions. The retractor has a winding prevention mechanism including a pawl and ratchet operable by a prior known control means to selectively lock the retractor against belt winding to hold the belt extended at a set slackened length with respect to the occupant. The improvement is comprised of a cam member which is rotatably mounted and has a cam surface which blocks movement of the pawl to the locked condition irrespective of the control means. The cam member also has a notch which allows the pawl to move to the locked condition with the ratchet. The cam member is coupled to the reel by a reduction gear set which causes the cam member to revolve less than one revolution during a plurality of reel revolutions upon movement of the belt between the fully wound and fully unwound conditions. The reduction gear set synchronizes the rotation of the cam member to align the circumferentially extending notch portion with the pawl only when the extent of belt unwinding is within the range of unwound length indicative of the belt having assumed an effective restraining length relative the occupant. Accordingly, the pawl is blocked from possible engagement with the ratchet and a previously engaged pawl will be disengaged from the ratchet whenever the door is opened.

3 Claims, 4 Drawing Figures

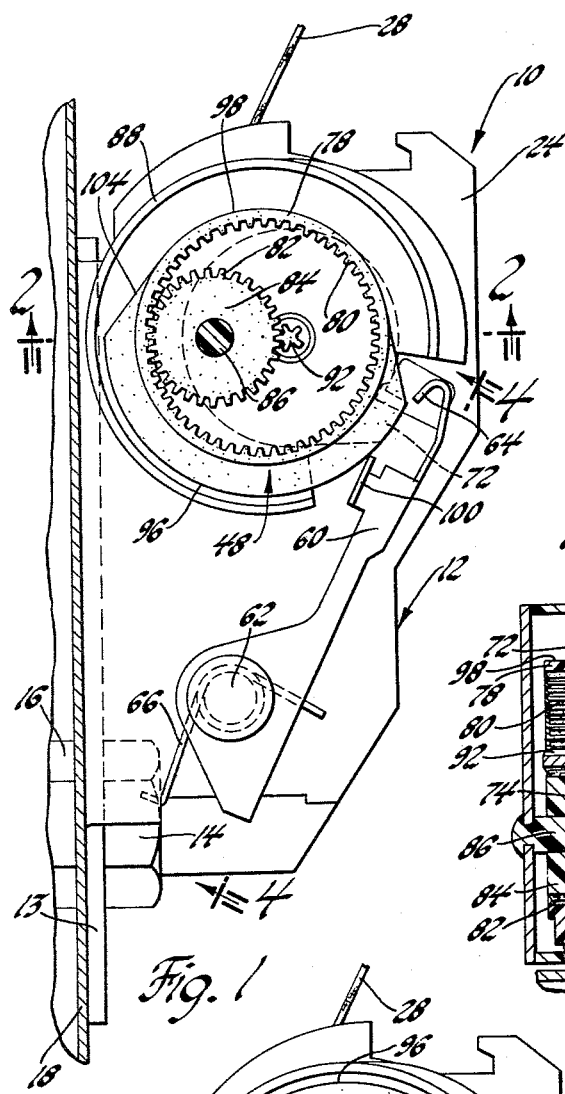
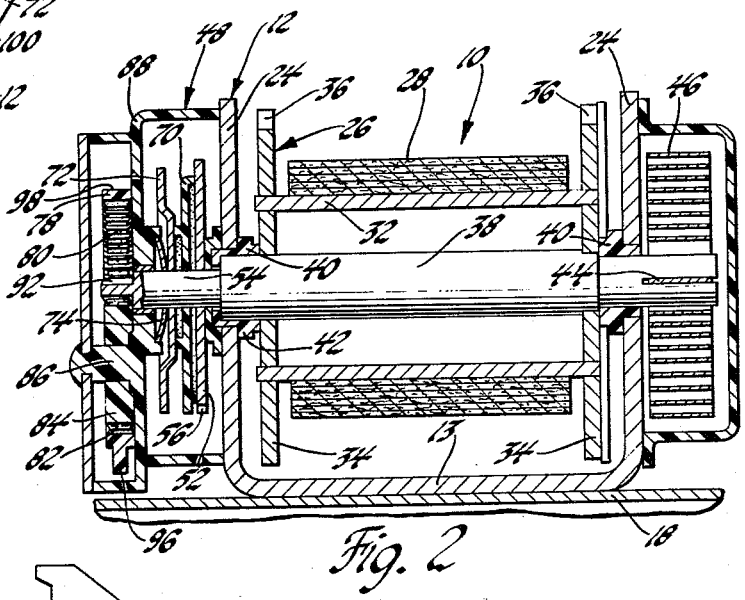
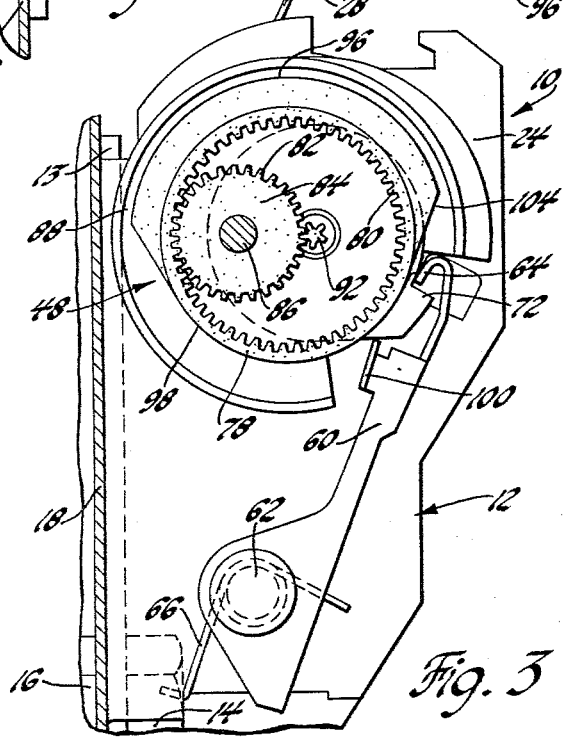
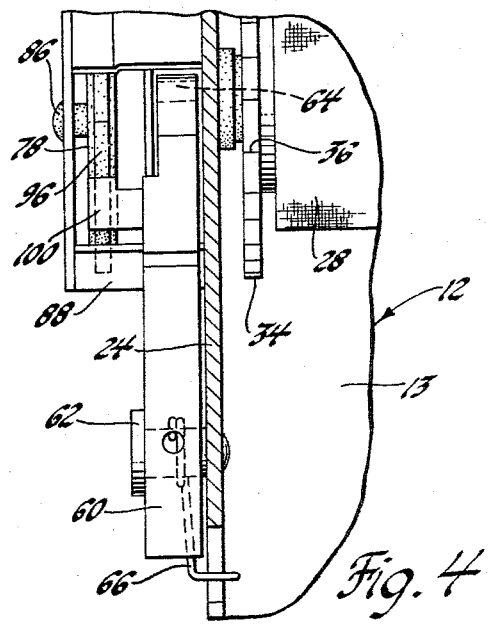

WINDING PREVENTION BELT RETRACTOR FOR PASSIVE SHOULDER BELT SYSTEM

The invention relates to a seat belt retractor for a door mounted passive shoulder belt and provides a mechanism for measuring the extent of belt unwinding and selectively blocking a winding prevention mechanism wheneverthe extent of belt unwinding indicates that the door is opened.

BACKGROUND OF THE INVENTION

It is well known to provide a motor vehicle occupant restraint system having a shoulder belt which extends over the shoulder and across the chest of the seated occupant. An inertia responsive seat belt retractor is conventionally associated with one end of the shoulder belt and has a windup spring which rotates a reel to wind or retract the belt to a taut condition across the chest of the occupant. The inertia retractor permits belt unwinding rotation of the reel to extend the belt as the occupant leans forwardly to reach the vehicle operating controls and locks the belt against extension in response to an acceleration stimulus experienced by the vehicle body.

It is also known to provide a retractor having a winding prevention mechanism which enhances occupant comfort by locking the reel against belt winding rotation by the windup spring to hold the belt at a set length establishing a slackened condition about the occupant. U.S. Pat. No. 4,023,746, issued to Joseph J. Magyar on May 17, 1977, provides an inertia locking retractor having a winding prevention mechanism which is selectively actuated and deactuated in response to a predetermined sequence of reel rotation induced by movement of the restrained occupant.

It is also known to provide a passive belt system having one end of the belt mounted on the door, the other end of the belt mounted on the vehicle body inboard the seat, and a retractor associated with one of the belt ends for winding the belt to a taut position about the occupant upon closing movement of the door and unwinding the belt upon opening movement of the door so that the swing geometry of the door stows the belt forwardly of the occupant.

It would be desirable to employ a winding prevention retractor in a door mounted passive seat belt system to enhance occupant comfort. However, the Magyar type winding prevention mechanism which is controlled in response to the predetermined sequence of belt winding and unwinding could be subject to unintended actuation of the winding prevention mechanism upon inadvertent random oscillatory movement of the door in the open position so that the belt would not be wound to the restraining position about the occupant upon a subsequent closure of the door until the occupant intentionally cancels the winding prevention mechanism by unwinding the belt from the reel.

The present invention features a new and improved winding prevention mechanism having a mechanism for measuring the extent of belt unwound from the retractor and adapted to block engagement of the winding prevention pawl whenever the belt is unwound beyond the extent consistent with deployment of the belt in the normal occupant restraint position so that the winding prevention pawl cannot become engaged when the door is opened and the winding prevention pawl will be automatically disengaged when the door is opened if the pawl has been previously set.

BRIEF SUMMARY OF THE INVENTION

The invention provides an inertia locking seat belt retractor for winding a shoulder belt having one end mounted on the vehicle door to move the belt between stowed and restraining positions upon movement of the door. The retractor has a winding prevention mechanism including a pawl and ratchet operable by a prior known control means to selectively lock the retractor against belt winding to hold the belt extended at a set length with respect to the occupant and operable to selectively unlock the retractor to permit belt winding. The improvement is comprised of a cam member which is rotatably mounted and has a first circumferentially extending cam surface which is engageable with the pawl to block pawl movement to the locked condition and an adjacent notched circumferentially extending portion which allows the pawl to move into locked position with the ratchet. The cam is coupled to the reel by a reduction gear set which causes the cam to revolve less than one revolution during a plurality of reel revolutions upon movement of the belt between the fully wound and fully unwound conditions. The reduction gear set times the rotation of the cam member to align the circumferentially extending notch portion with the pawl only when the extent of belt unwinding is within the range of unwound length indicative of the belt having assumed an effective restraining position relative the occupant. Accordingly, the pawl is blocked from possible engagement with the ratchet when the door is open and a previously engaged pawl will be disengaged from the ratchet whenever the door is opened.

One object, feature and advantage of the invention resides in the provision of a winding prevention mechanism having an associated timing mechanism which is effective to prevent the engagement of the winding prevention mechanism except when the measured extent of belt unwinding indicates that the restraint belt is deployed in an effective occupant restraining position.

Another object, feature and advantage of the invention resides in the provision of a winding prevention mechanism having an associated measuring mechanism effective to measure the extent of belt unwinding and to automatically disengage the winding prevention mechanism upon belt unwinding to an extent indicating that the vehicle door is being opened.

BRIEF DESCRIPTION OF THE DRAWINGS

These and other features, objects and advantages of the invention will become apparent upon consideration of the specification and the appended drawings in which:

FIG. 1 is a side elevation view of the retractor showing the winding prevention pawl held at a disengaged position by the cam member;

FIG. 2 is a sectional view taken in the direction of arrows 2—2 of FIG. 1;

FIG. 3 is a view similar to FIG. 1 but showing the cam member having unblocked the winding prevention pawl for normal operation by the control means; and FIG. 4 is a sectional view taken in the direction of arrows 4—4 of FIG. 1.

DETAILED DESCRIPTION OF THE PREFERRED EMBODIMENT

Referring to FIGS. 1 and 2 of the drawings, a vehicle occupant restraint belt retractor is generally indicated by 10 and includes a metal housing generally designated by 12. The base wall 13 of the housing of the retractor includes a weld nut 14 that permits a threaded bolt 16 to secure the lower side of the retractor to a vehicle body support member 18. Since the retractor 10 is particularly suited for use as a shoulder belt retractor in a door mounted passive seat belt system, the support member 18 may be either a portion of the vehicle door or a portion of the vehicle body situated inboard the occupant seating position. The retractor housing 12 also includes spaced parallel sidewalls 24 that are formed integral with the base wall as seen in FIG. 2. A belt reel designated generally by 26 is rotatably mounted between the sidewalls 24 of the retractor housing 12 and receives a belt 28 which extends outwardly for positioning over the shoulder and across the chest of a vehicle occupant to provide a restraining function in a manner to be described hereinafter.

The belt reel 26 of retractor 10 includes an elongated drum 32 on which the belt 28 is wound and which extends between ratchet plates 34 on the opposite sides of the belt. The ratchet plates 34 are suitably fixed to the opposite ends of the belt drum 32 and have ratchet teeth 36 that face in the belt unwinding direction of reel rotation. The belt unwinding direction is clockwise as viewed in FIG. 1. An elongated reel shaft 38 is received by the belt drum 32 and suitably fixed to the ratchet plates 34 such as by splining. The ends of shaft 38 are rotatably supported on the housing sidewalls 24 by pushing portions 40 of a pendulum support member 42.

The FIG. 2 right-hand end of shaft 38 extends outwardly through the adjacent housing wall 24 and has a slot which receives the inner end 44 of a spiral or clock spring 46. The outer end of this spring, not shown, is suitably fixed to the adjacent housing sidewall 24 so that the belt reel 26 is normally biased in a belt winding direction to store the belt 28 on the belt reel 26.

A conventional inertia locking mechanism is associated with the retractor 10 to selectively lock the belt reel 26 against rotation in the belt unwinding direction. The inertia locking mechanism, not shown, includes a lock bar pivotally mounted on the housing sidewalls 24 and having teeth engageable with the ratchet teeth 36 of the ratchet plates 34. An inertia sensing member such as a pendulum moves in response to abrupt vehicle acceleration or deceleration to move the lock bar into engagement with the ratchet teeth 36 and thereby prevent unwinding rotation of the reel. Reference may be had to U.S. Pat. No. 4,023,746, issued to Joseph J. Magyar on May 17, 1977 for a complete description of such a conventional inertia sensing mechanism.

Referring again to FIG. 2, it is seen that the left-hand end of shaft 38 extends outwardly through the adjacent housing sidewall 24 and is coupled with a winding prevention mechanism, generally designated at 48. The winding prevention mechanism includes a ratchet plate 52 which is suitably splined to a reduced diameter end portion 54 of the elongated reel shaft 38 for rotation therewith. The ratchet plate 52 is circular and has ratchet teeth 56 that face in the counterclockwise belt winding direction of reel rotation, oppositely of the ratchet teeth 36 on the ratchet plates 34.

A pawl 60, best seen in FIG. 1, is pivotally mounted on the housing sidewall 24 by a rivet 62 and has a pawl tooth 64 at the end thereof. A coil spring 66 encircles the rivet 62 and urges the pawl 60 in the direction to cause its tooth 64 to engage with the teeth 56 of ratchet plate 52.

The winding prevention mechanism 48 also includes a control disc 70 and a blocking disc 72 which are frictionally clutched to the ratchet plate 52 for limited rotation therewith by an annular spring washer 74. The control disc 70 and the blocking disc 72 have peripheral surfaces which coact with the pawl tooth 64 in a manner to control movement of the pawl 60 between a position of FIG. 1 in which the pawl tooth 64 is radially raised away from engagement with the ratchet plate 52 to permit free belt winding rotation and a radially lowered position of FIG. 3 in which the pawl tooth 64 is engaged with the ratchet plate 52 to prevent belt winding rotation of the reel.

A complete description of the construction and function of the control disc 70 and blocking disc 72 and the manner in which they cooperate to control movement of the pawl 60 may be had by reference to U.S. Pat. No. 4,023,746, issued to Joseph J. Magyar on May 17, 1977. For purposes of understanding the present invention, it is sufficient to understand that the pawl is operated between the disengaged position of FIG. 1 and the engaged position of FIG. 3 in response to a predetermined sequence of reel winding and unwinding rotation. More particularly, when the door is closed from the fully opened condition, the belt 10 is wound upon the reel 26 and assumes a restraining position across the chest of the occupant. A slight subsequent unwinding of the belt by pulling on the belt or leaning forward causes the control disc 70 and blocking disc 72 to engage the pawl 60 with the ratchet plate 52 to thereby relieve the occupant of the belt tension.

The present invention provides a measuring mechanism comprised of a ring gear cam member 78 which selectively blocks and unblocks the pawl 60. In FIG. 1 it is seen that the cam member 78 has ring gear teeth 80 on the inner peripheral surface thereof which mesh with teeth 82 of an idler gear 84 which is rotatably journalled on a shaft portion 86 of a plastic housing 88 which encloses the winding prevention mechanism 48. The idler gear 84 in turn meshes with a pinion gear 92 integral with the end of the reel shaft 38. The pinion 92 and idler gear 84 provide a speed reduction gear set which rotates the cam member 78 through less than one complete revolution during a plurality of reel 26 revolutions upon movement of the belt between the fully wound and fully unwound conditions.

As seen in FIG. 1, the ring gear cam member 78 has an outer peripheral surface which includes a radially raised cam surface 96 and an adjacent notch portion 98 having a lesser radial dimension than the cam surface 96. The pawl 60 includes a laterally offset pawl projection 100 which overlies the peripheral surface of cam member 78 as best seen in FIG. 4. The rotational position of the cam member 78 depicted in FIG. 1 causes the cam surface 96 thereof to engage with the pawl projection 100 to thereby support the pawl tooth 64 at a radially raised position away from the ratchet plate 52. Accordingly, the pawl 60 is blocked against movement into engagement with the ratchet plate 52 irrespective of the occurrence of the predetermined sequence of belt winding and unwinding which would normally cause the control disc 70 and blocking disc 72 to engage the pawl 60 with the ratchet plate 52. The rotational position of the cam member 78 depicted in FIG. 3 aligns the notch portion 98 thereof with the pawl projection 100, thus unblocking the pawl tooth 64 for control by the control disc 70 and blocking disc 72. As seen in FIG. 3, the outer peripheral surface of the cam member 78 includes a lifting portion 104 at the transition between the cam surface 96 and notch portion 98 so that the pawl 60 will be moved radially outward upon belt unwinding beyond the position of FIG. 3.

In operation, when the door is closed, the belt 28 is substantially wound upon the reel 26 and is disposed in an effective restraining position about the seated occupant. Accordingly, the notch 98 of the cam member 78 will be aligned with the pawl 60 so that the pawl is unblocked for possible engagement with the ratchet plate 52 as determined by the control disc 70 and blocking disc 72. As the belt 28 is unwound from the retractor, either by opening movement of the door or by the occupant leaning forward, the cam member 78 is rotated in the clockwise direction. When the belt unwinding has proceeded to an extent which exceeds the distance known to be consistent with the belt being positioned in the restraining mode, the lifting portion 104 of the cam member 78 raises the pawl 60 radially outward onto the cam surface 96. Thus, the lifting portion 104 will automatically cancel any previously set slackened length when the belt unwinding exceeds a certain extent. Furthermore, the pawl 60 is blocked from radially inward movement irrespective of the occurrence of the predetermined sequence of belt winding and unwinding which would normally cause the control disc 70 and blocking disc 72 to engage the pawl 60 with the ratchet plate 52. Accordingly, the cam surface 96 blocks the winding prevention pawl 60 from movement into engagement with the ratchet plate 52 whenever the door is open.

It will be understood that the circumferential extent of the cam surface 96 and the notch portion 98 may be varied to order to obtain the desired range of belt unwinding in which the pawl 60 is unblocked to permit its engagement with the ratchet plate 52. Furthermore, the circumferential extent of the notch 98 may be matched with a particular vehicle installation to permit engagement of the winding prevention mechanism by the control disc 70 and blocking disc 72 only when extent of belt unwinding is indicative of the belt being deployed in an effective occupant restraining position as distinguished from a greater extent of unwinding which occurs when the door is being opened.

Thus, it is seen that the invention provides a new and improved winding prevention mechanism for measuring the extent of belt unwound from the retractor and adapted to block engagement of the winding prevention pawl whenever the belt is unwound beyond the extent consistent with deployment of the belt in the normal occcupant restraint position so that the winding prevention pawl cannot become engaged when the door is opened. Furthermore, if the winding prevention pawl has been previously engaged, the measuring mechanism will automatically disengage the pawl when the door is opened irrespective of any cancellation feature which may be provided by the control disc 70 and blocking disc 72.

It will be understood that the measuring mechanism provided by the cam member 78 may be useful in winding prevention mechanisms other than the Magyar type disclosed herein. For example, U.S. Pat. No. 4,153,274, issued May 8, 1979, by Lloyd Rogers et al., discloses a winding prevention mechanism which is manually actuatable to engage the pawl with the ratchet and thereby hold the belt extended at a slackened length about the occupant. The measuring mechanism disclosed herein is useful in the Rogers type winding prevention mechanism in that the winding prevention mechanism cannot be manually set if the extent of belt unwinding is not indicative of the extent of belt unwinding being unwound within a range consistent with deployment of the belt in a proper restraining position about the occupant.

Furthermore, although the invention is described herein as particularly suited to a retractor employed in a door mounted passive seat belt system, the invention may be used in a conventional active seat belt system where it may be desired to prevent the winding prevention mechanism from being engaged whenever the extent of belt unwinding is greater than or lesser than an extent known to dispose the belt in an occupant restraint position.

The embodiments of the invention in which an exclusive property or privilege is claimed are defined as follows:

1. In an automotive vehicle having a door and an occupant seat, the combination comprising: a restraint belt having one end mounted on the door and the other end mounted on the vehicle inboard the seat, a retractor provided at one of the belt ends and having a belt reel and a winding spring for winding the belt on the reel to an occupant restraining position during door closing movement and unwinding the belt during door opening movement, detent means associated with the retractor and operable to selectively lock the retractor against belt winding to hold the belt extended at a set length with respect to the occupant and unlock the retractor to permit belt winding, control means adapted to selectively operate the detent means between the locked and unlocked conditions, cam means associated with the retractor for selecitvely blocking operation of the detent means to the locked condition by the control means; and drive means for controlling the cam means in response to belt winding and unwinding, said cam means and said drive means cooperating throughout a plurality of belt unwinding reel revolutions to differentiate between an extent of belt unwinding indicative of disposition of the belt in the occupant restraining position and a greater extent of belt unwinding indicative of door opening movement and adapted to block operation of the detent means to the locked condition by the control means whenever the extent of belt unwinding is in excess of the extent indicative of disposition of the belt in the occupant restraining position.

2. In an automotive vehicle having a door and an occupant seat, the combination comprising: a restraint belt having one end mounted on the door and the other end mounted on the vehicle inboard the seat, a retractor provided at one of the belt ends and having a winding spring for winding the belt to an occupant restraining position during door closing movement and unwinding the belt during door opening movement, a pawl and ratchet associated with the retractor and operable to selectively lock the retractor against belt winding to hold the belt extended at a set length with respect to the occupant and unlock the retractor to permit belt winding, control means adapted to selectively operate the pawl between the locked and unlocked conditions, cam means having a first circumferentially extending portion engageable by the pawl to block operation of the pawl to the locked condition and a second circumferentially extending portion adjacent the first circumferentially extending portion allowing operation of the pawl to the locked condition, and reduction gear drive means for rotating the cam means through less than one complete revolution during movement of the belt between the fully wound and fully unwound conditions, said cam means and said drive means cooperating to align the second circumferentially extending portion of the cam means with the pawl only when the extent of belt unwinding is within range of unwound length indicative of the belt having assumed an effective restraining length relative the occupant whereby the pawl is prevented from engagement with the ratchet when the door is open and the previously engaged pawl is disengaged from the ratchet whenever the door is opened.

3. In combination, an automotive vehicle having an occupant seat, a restraint belt for restraining the occupant in the seat, a reel having the belt wound thereon, a winding spring urging winding rotation of the reel to retract the belt to a stored position on the reel and pull the belt taut against the occupant, a pawl and ratchet associated with the reel, means operative to control movement of the pawl between retraction permitting disengagement with the ratchet and retraction preventing engagement with the ratchet to hold the belt extended at a set slackened length with respect to the seat, and means operative to measure the extent of belt unwinding throughout a plurality of reel revolutions and adapted to prevent engagement of the pawl with the ratchet whenever the extent of belt unwound is greater than or lesser than a range of unwound length indicative of the belt having assumed an effective restraining position relative the occupant.

* * * * *